(12) United States Patent
Gunadisastra et al.

(10) Patent No.: US 7,995,492 B2
(45) Date of Patent: Aug. 9, 2011

(54) MULTI-SPEED STACK INTERFACE

(75) Inventors: Peter Gunadisastra, Palo Alto, CA (US); Stephen Patrick Kolecki, Austin, TX (US); Jason Visneski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 12/343,294

(22) Filed: Dec. 23, 2008

(65) Prior Publication Data
US 2010/0158041 A1    Jun. 24, 2010

(51) Int. Cl.
*H04L 12/66* (2006.01)
(52) U.S. Cl. ........ 370/252; 370/392; 370/401; 370/419; 370/463; 709/238
(58) Field of Classification Search ........................ None
See application file for complete search history.

(56) References Cited

U.S. PATENT DOCUMENTS

| | | | | |
|---|---|---|---|---|
| 7,295,552 | B1 * | 11/2007 | Kadambi et al. | 370/392 |
| 2003/0058894 | A1 * | 3/2003 | Feuerstraeter et al. | 370/518 |
| 2005/0071514 | A1 * | 3/2005 | Anderson et al. | 710/1 |
| 2006/0277324 | A1 * | 12/2006 | Aldereguia et al. | 710/1 |
| 2007/0081463 | A1 * | 4/2007 | Bohra et al. | 370/235 |

\* cited by examiner

*Primary Examiner* — Chi H. Pham
*Assistant Examiner* — Shick Hom
(74) *Attorney, Agent, or Firm* — Schwegman, Lundberg & Woessner, P.A.

(57) ABSTRACT

Various embodiments provide an apparatus and method for configuring a shared data rate in a stackable interface network. An example embodiment includes detecting a data cable identifier, the data cable identifier being indicative of a first data rate capacity associated with a data cable identified by the data cable identifier; propagating information indicative of the first data rate capacity to at least one of a plurality of network devices connected via stackable network interfaces; receiving information indicative of a second data rate capacity from at least one of the plurality of network devices; determining an appropriate shared data rate from the information indicative of the first data rate capacity and the information indicative of the second data rate capacity; and configuring at least one of the plurality of network devices to communicate via a stackable network interface at the shared data rate.

25 Claims, 6 Drawing Sheets

MULTI-SPEED STACK INTERFACE

FIELD

The disclosed subject matter relates to the field of data processing devices, and more particularly to networked data processing devices.

BACKGROUND

Stacking is the ability to manage a group of network devices, such as switches, as a single unit. Stackability gives multiple physical switches the appearance of one large physical switch. The stacked switches may be coupled using various technologies including a connection between network ports, a connection between dedicated stacking ports, or a connection utilizing a specialized stacking bus. Stacking can be used to create a switch with a large number of ports which can be managed utilizing a single interface.

Stacked switches are typically connected via a set of cables between network devices. The stacked switches and cables e should be carefully designed and implemented as high data rates are needed between network devices. High data rates require optimal conditions in the data paths and interfaces.

There is a demand to provide a stackable interface at the highest possible speed and at a long cable length. However, long cable lengths can cause degradation in the data signals travelling through the stackable interface and may cause undesirable decreases in the associated data rates.

DESCRIPTION OF EXAMPLE EMBODIMENTS

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Overview

An apparatus and method for configuring a shared data rate in a stackable interface network is disclosed. An example embodiment includes detecting a data cable identifier, the data cable identifier being indicative of a first data rate capacity associated with a data cable identified by the data cable identifier; propagating information indicative of the first data rate capacity to at least one of a plurality of network devices connected via stackable network interfaces; receiving information indicative of a second data rate capacity from at least one of the plurality of network devices; determining an appropriate shared data rate from the information indicative of the first data rate capacity and the information indicative of the second data rate capacity; and configuring at least one of the plurality of network devices to communicate via a stackable network interface at the shared data rate.

Example Embodiments

As described further below, according to various example embodiments, there is provided an apparatus and method for configuring a shared data rate in a stackable interface network. An example embodiment is described wherein a network device includes a stackable network interface and configuration logic. The network device configuration logic can be configured to detect a data cable identifier, the data cable identifier being indicative of a first data rate capacity associated with a data cable identified by the data cable identifier. The network device configuration logic can be further configured to propagate information indicative of the first data rate capacity to at least one of a plurality of network devices connected via the stackable network interface, receive information indicative of a second data rate capacity from at least one of the plurality of network devices, determine an appropriate shared data rate from the information indicative of the first data rate capacity and the information indicative of the second data rate capacity, and configure the network device to communicate via the stackable network interface at the shared data rate.

Another example embodiment is described wherein the system includes a data cable, a stackable network interface to which the data cable can be coupled, and configuration logic. The configuration logic can be configured to detect a data cable identifier, the data cable identifier being indicative of a first data rate capacity associated with the data cable. The system configuration logic can be further configured to propagate information indicative of the first data rate capacity to at least one of a plurality of network devices connected via the stackable network interface, receive information indicative of a second data rate capacity from at least one of the plurality of network devices, determine an appropriate shared data rate from the information indicative of the first data rate capacity and the information indicative of the second data rate capacity, and configure the network device to communicate via the stackable network interface at the shared data rate.

Figure 1:
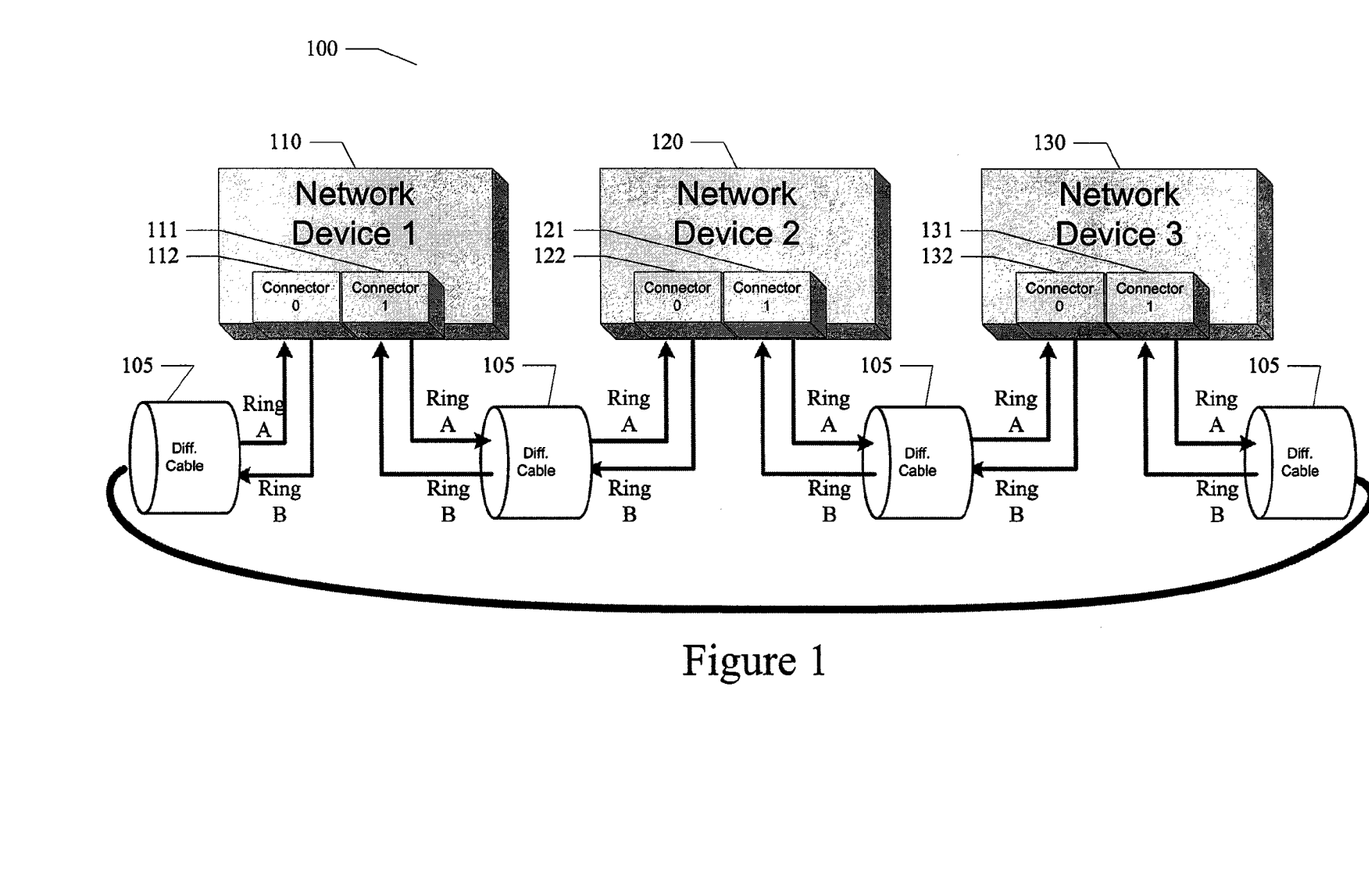
FIG. 1 illustrates an example network of a particular embodiment having several network devices in communication with each other via stackable network interfaces.

FIG. 1 illustrates an example stackable network 100 of a particular embodiment having several network devices in communication with each other via stackable network interfaces. The example stackable network 100 shown includes several network devices 110, 120, and 130 in communication with each other via communication paths embodied in a data cable 105. As will be described in more detail below, data cable 105 includes high speed data pathways arranged in a counter-rotating dual ring configuration. It will be apparent to those of ordinary skill in the art that data cable 105 can support additional numbers of rings in alternative embodiments. As shown in FIG. 1, data cable 105 connects to each network device 110, 120, and 130 via dual sets of connectors or stackable network interfaces (111/112, 121/122, 131/132). In this configuration, data can flow into a network device connector from data cable 105 and then the data can flow out from the network device via the other network device connector into another portion of data cable 105. Data can then flow into the next network device via that device's network device connector. Note, however, that the portions of data cable 105 connecting each network device can be different lengths or of different data carrying capacities. Nevertheless, data can flow through a plurality of network devices in a ring configuration when each of the portions of data cable 105 are connected. In the example embodiment shown in FIG. 1, data in a first ring (e.g. ring A) can flow in one direction while data in a second ring (e.g. ring B) can flow in the opposite direction. In a particular embodiment, each ring can have a plurality of transmit channels and a plurality of receive channels. Using the configuration shown in FIG. 1, data rates of 10.3125 Gbps (Giga bits per second) can be achieved.

Although high data rates can be achieved using the configuration shown in FIG. 1, data cable insertion loss increases as data speed increases and as the length of data cable 105 increases. In particular, using a NRZ (Non Return to Zero) data signaling, the insertion loss to cross-talk ratio will degrade with electrical cable length and interface speed. Thus, in a typical implementation, it can be beneficial to limit the length of data cable 105 (e.g. 3 meters) to retain a high data rate in the stackable network. In some applications, a limited length of data cable may be acceptable. However, in other cases, it is important to provide for a longer data cable length to accommodate a particular installation. Unfortunately, conventional systems either cannot accommodate these installations or a significant level of re-design or re-configuration is used to accommodate the installation.

To address this problem, various embodiments described herein provide a multiple speed stackable network configuration that does not require a separate clock source. The example embodiment of the multiple speed stackable network configuration described herein can provide high data rates for applications wherein short length (e.g. data cable lengths where insertion loss is not significant or is manageable) data cables are used. Additionally, the multiple speed stackable network configuration described herein can support longer data cable lengths by reducing the data rate in the stackable network to a level where the insertion loss is not significant or is manageable. In this manner, the multiple speed stackable network configuration described herein can support a wide range of data cable lengths and thus can support a greater number of applications or installations.

As part of a particular embodiment described herein, a data cable identifier is inserted into the data cable used in a particular stackable network. The data cable identifier can provide information indicative of a data rate capacity associated with the data cable (or portion thereof) identified by the data cable identifier. In a particular embodiment, pull-up resistors can be installed into a data cable to provide a suitable cable identifier that can be read by a network device into which the data cable is inserted. It will be apparent to those of ordinary skill in the art that other equivalent methods can be used to tag a data cable with an identifier or code that provides information indicative of a data rate capacity associated with the data cable. In some circumstances, the data rate capacity encoded into the data cable can be associated with the length of the data cable. In other circumstances, the data rate capacity encoded into the data cable can be associated with the wire gauge, the conductor material type, the configuration of conductors in the cable, or other factors that tend to affect the data rate that the cable can support.

Figure 2:
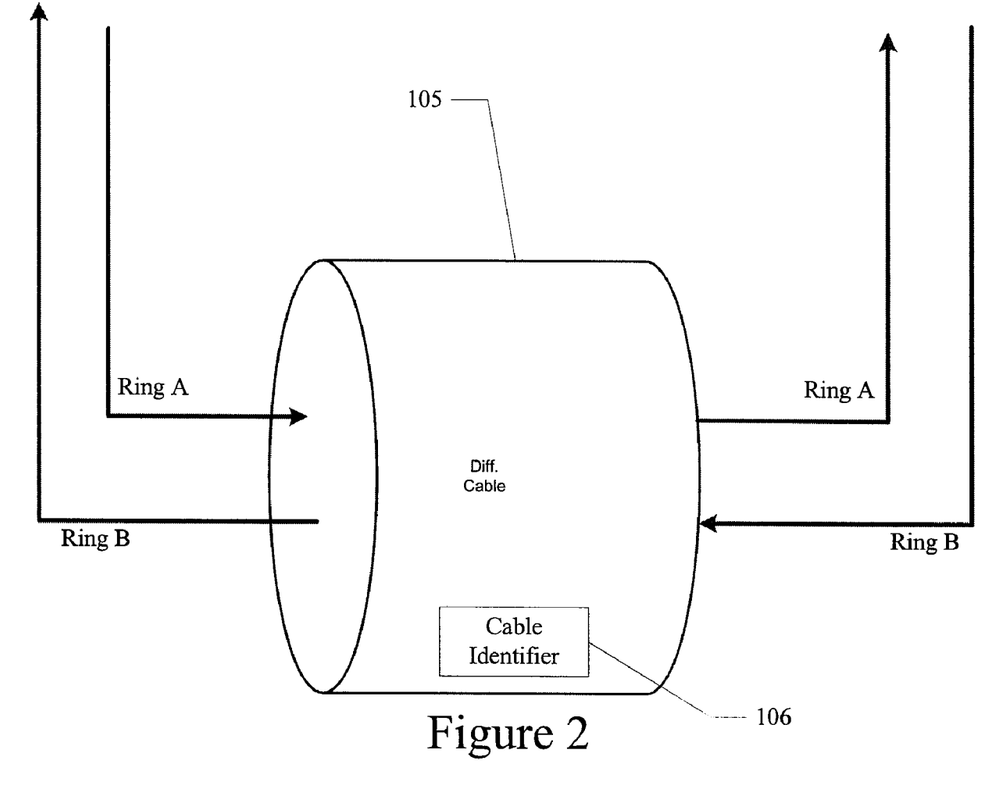
FIG. 2 illustrates a data cable used in a particular example embodiment.

FIG. 2 illustrates a data cable used in a particular example embodiment. As shown, data cable 105 includes a data cable identifier 106 built into the cable using any of the various methods described above. The data cable identifier 106 can provide information indicative of a data rate capacity associated with the data cable 105 identified by the data cable identifier 106. As configured with cable identifier 106, a network device to which the cable 105 is inserted, may read the data cable identifier 106 and thereby determine a data rate capacity suitable for the inserted data cable 105.

Figure 3:
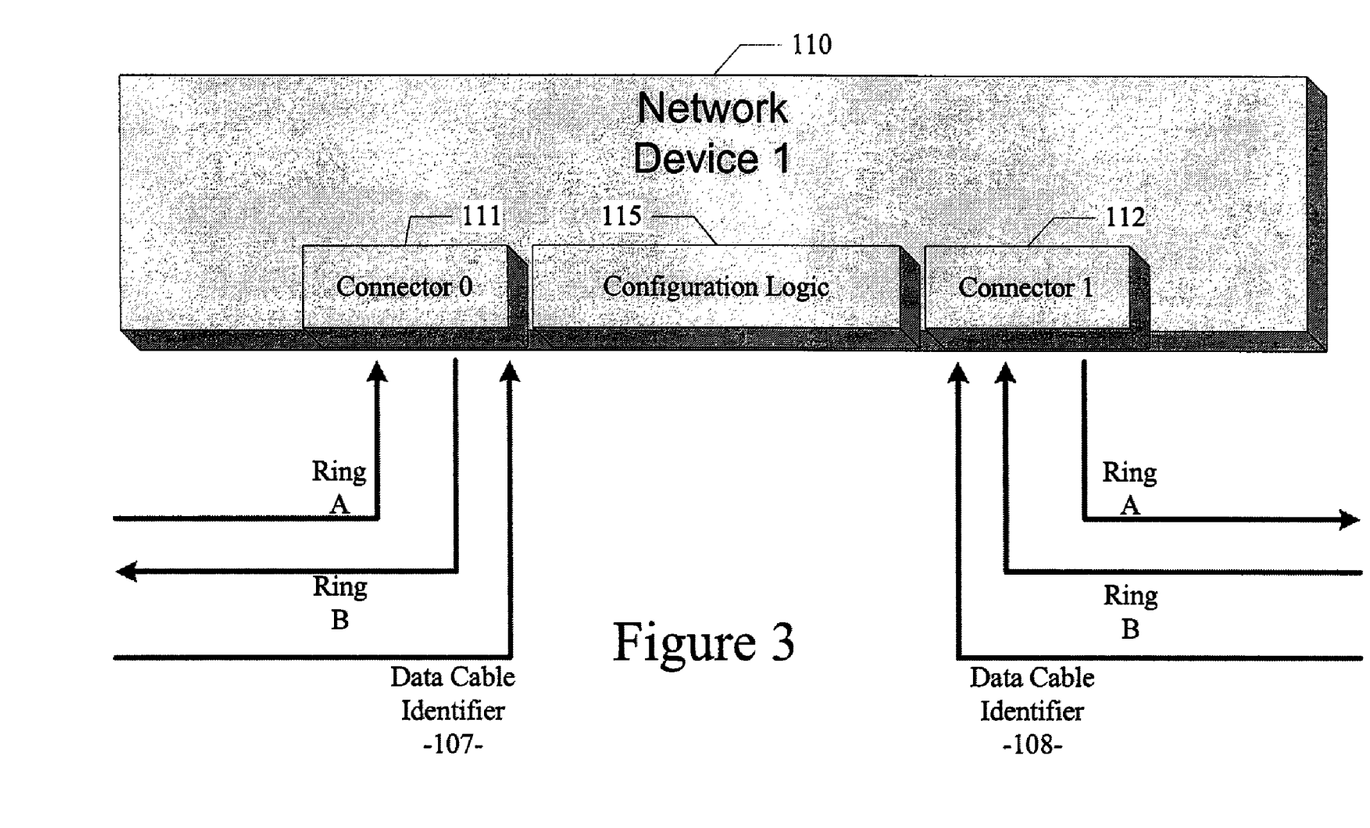
FIGS. 3 and 4 illustrate a network device used in particular example embodiments.

FIG. 3 illustrates a network device used in a particular example embodiment. As described above and shown in FIG. 3, network device 110 includes connectors 111 and 112 to which portions of data cable 105 can be connected. In this configuration, data can flow into the network device connector 111 from a first portion of data cable 105 and then the data can flow out from the network device 110 via the other network device connector 112 and back into a second portion of data cable 105. As described above, data cable 105 can include high speed data pathways arranged in a counter-rotating dual ring configuration (e.g. Ring A and Ring B shown in FIG. 3). It will be apparent to those of ordinary skill in the art that data cable 105 can support additional numbers of rings in alternative embodiments. As also described above, portions of data cable 105 can be embedded or configured with data cable identifiers 107 and 108 corresponding to the data cable portions inserted into connectors 111 and 112, respectively, shown in FIG. 3. Network device 110 can read the data cable identifier or other code 107 and 108 embedded into data cable 105 using any of the various techniques described above. Data cable identifiers 107 and 108 can be configured with information indicative of a data rate capacity associated with the corresponding portion of data cable 105.

Figure 4:
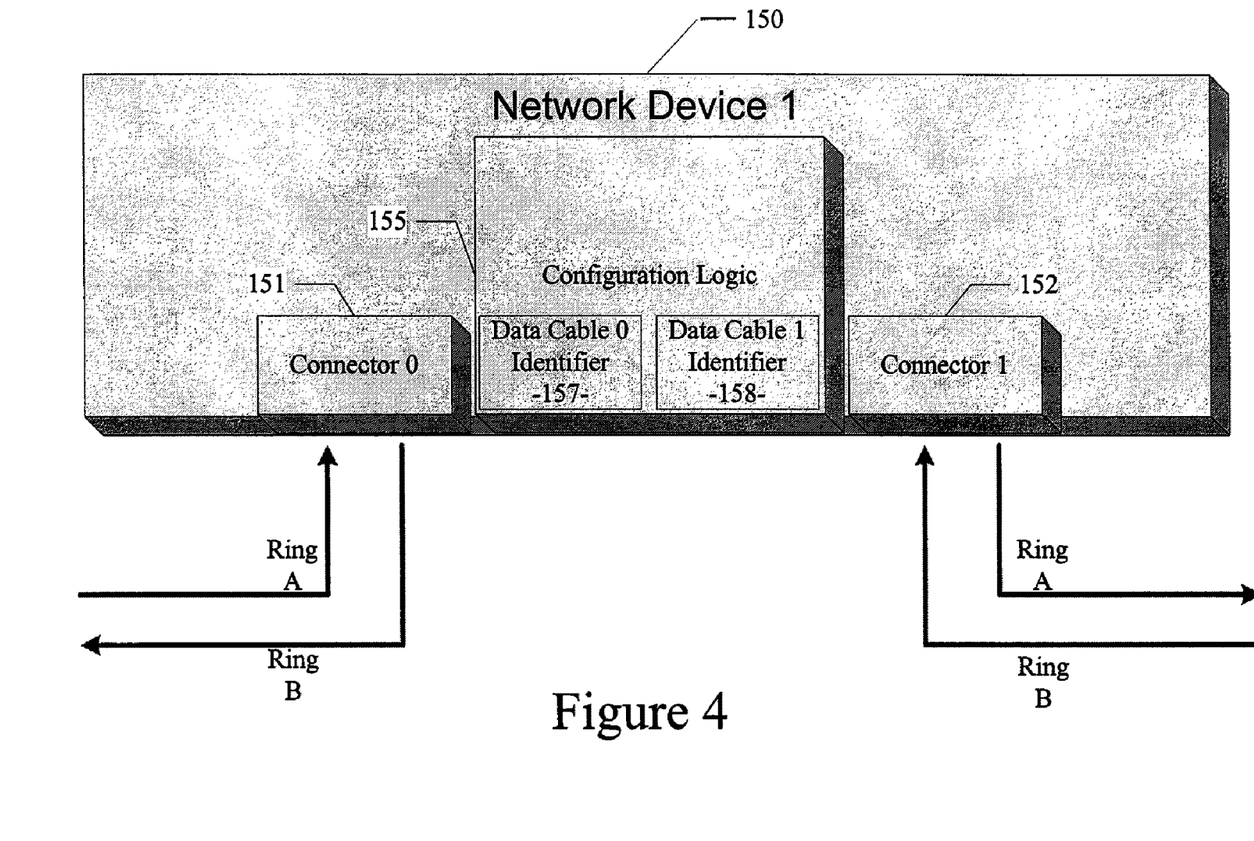

In an alternative embodiment shown in FIG. 4, a network device 150 can be configured to store data cable identifiers 157 and 158 within a configurable memory of network device 150. Data cable identifiers 157 and 158 can be configured to store a data cable identifier corresponding to data cables inserted into connectors 151 and 152, respectively. Network device resident data cable identifiers can be used if a particular data cable cannot be configured to retain the data cable identifier within the cable itself.

Referring again to FIG. 3, the network device 110 also includes configuration logic 115. Configuration logic 115 provides the functionality within the network device 110 for configuring the speed at which data is transferred in the stackable network and through the data cable 105 connected to connectors 111 and 112. It will be apparent to those of ordinary skill in the art that configuration logic 115 can be implemented in software, firmware, hardware, or a combination thereof within the network device 110.

In an example embodiment, configuration logic 115 can be configured to detect the data cable identifier 107 and 108 either embedded in data cable 105 as described above or previously stored as data cable identifiers 157 and 158 in storage areas of network device 150 and accessible by configuration logic 155 (as shown in the example of FIG. 4). The data cable identifier can include information associated with a data rate capacity associated with the data cable identified by the data cable identifier. For example, the data cable identifier may include a code that specifies the length of the data cable. This code, or other information obtained from the data cable identifier, can be used by configuration logic 115 to access a table or database that associates a data rate capacity corresponding to the data cable. For example, a particular code identifier may be used to determine that a particular data cable is less than 3 meters in length. Using this information, the configuration logic 115 may determine that the data cable can therefore support data rates up to 10 Gbps. Alternatively, another particular code identifier may be used to determine that another particular data cable is up to 10 meters in length. Using this information, the configuration logic 115 may determine that this data cable can therefore support data rates only up to 5 Gps. It will be apparent to those of ordinary skill in the art that other cable identifiers can form associations between a particular data cable and corresponding data rate capacities or other data communication characteristics for that cable.

Once the configuration logic 115 obtains the data rate capacity(ies) associated with the data cables connected to the corresponding network device 110, the network device configuration logic 115 can propagate information indicative of its data rate capacity(ies) to at least one other of a plurality of network devices connected via the stackable network interface. The network device 110 can use a pre-configured initialization communication data rate and/or protocol to reliably convey the data rate capacity(ies) to at least one other network device in the stackable network.

In a particular embodiment, the network devices 110 of a particular network can be configured to use data rates that are graduated in speed steps defined in terms of powers of two. In this manner, the example embodiment described herein can use a single standard clock source and does not require a second clock source, such as an extra phase locked loop (PLL) clock generator. Instead, the clock signal provided by the single standard clock source can be variably reduced by powers of two to produce a range of graduated speed steps the configuration logic 115 can use to selectively configure a particular network device 110 for an appropriate data rate.

As described above, each of the network devices in the stackable network can obtain cable identifiers and associated data rate capacities for the data cables connected to them. Each of the other network devices in the stackable network can propagate their data rate capacity(ies) to at least one other of the plurality of network devices connected in the stackable network.

Given a sufficient amount of time, each of the network devices in the stackable network can receive and retain the data rate capacities for each of the other network devices in the stackable network using the method described above. Once the data rate capacities for each of the network devices in the stackable network are known to each of the other network devices, a particular one of the network devices in the stackable network can be designated as the data cable speed director. The data cable speed director can be designated in any of a number of ways. First, the network device having the slowest data rate capacity may be designated as the data cable speed director. Secondly, a pre-determined network device address or device identifier may be designated as the data cable speed director. Thirdly, the network device that was last to report its data rate capacity(ies) may be designated as the data cable speed director. It will be apparent to those of ordinary skill in the art that other methods can be used to designate a data cable speed director.

Once the data cable speed director has been designated using any of the methods described above, the configuration logic 115 in the network device 110 designated as the data cable speed director can access the data rate capacity data obtained from each of the network devices in the stackable network. The configuration logic 115 of the network device acting as the data cable speed director can then determine an appropriate shared data rate from the information indicative of the data rate capacities received from each of the network devices in the stackable network. For example, in a particular embodiment, the configuration logic 115 can determine that the appropriate shared data rate to use for all network devices in the stackable network is the slowest data rate reported by any one of the network devices in the stackable network. In another particular embodiment, the configuration logic 115 can determine that the appropriate shared data rate to use is a data rate slower than any data rate reported by any one of the network devices in the stackable network. It will be apparent to those of ordinary skill in the art that other methods can be used to determine an appropriate shared data rate from the information indicative of the data rate capacities received from each of the network devices in the stackable network.

After the data cable speed director determines an appropriate shared data rate using any of the methods described above, the configuration logic 115 in the network device 110 designated as the data cable speed director can configure each of the other network devices in the stackable network to communicate via the stackable network interfaces at the shared data rate. An initialization protocol can be used to synchronize each of the network devices at the shared data rate. Given that the data cable speed director determined the shared data rate from the data rate capacities reported by each of the network devices in the stackable network, each of the network devices will be able to communicate on the stackable network at the shared data rate. Once this communication is confirmed, the stackable network can terminate an initialization state and enter a normal runtime state at the shared data rate.

In an alternative embodiment, the embodiment does not designate a data cable speed director to command all other network devices of the stackable network to communicate at the determined shared data rate. In this alternative embodiment, each of the network devices in the stackable network can receive and retain the data rate capacities for each of the other network devices in the stackable network using the methods described above. Once the data rate capacities for each of the network devices in the stackable network are known to each of the other network devices, each of the network devices in the stackable network can begin communicating on the stackable network at the slowest data rate reported by any one of the network devices in the stackable network. Given that the slowest data rate reported by any of the network devices in the stackable network may be used as a shared data rate, each of the network devices will be able to communicate on the stackable network at the shared data rate. Once this communication is confirmed, the stackable network can terminate an initialization state and enter a normal runtime state at the shared data rate.

Figure 5:
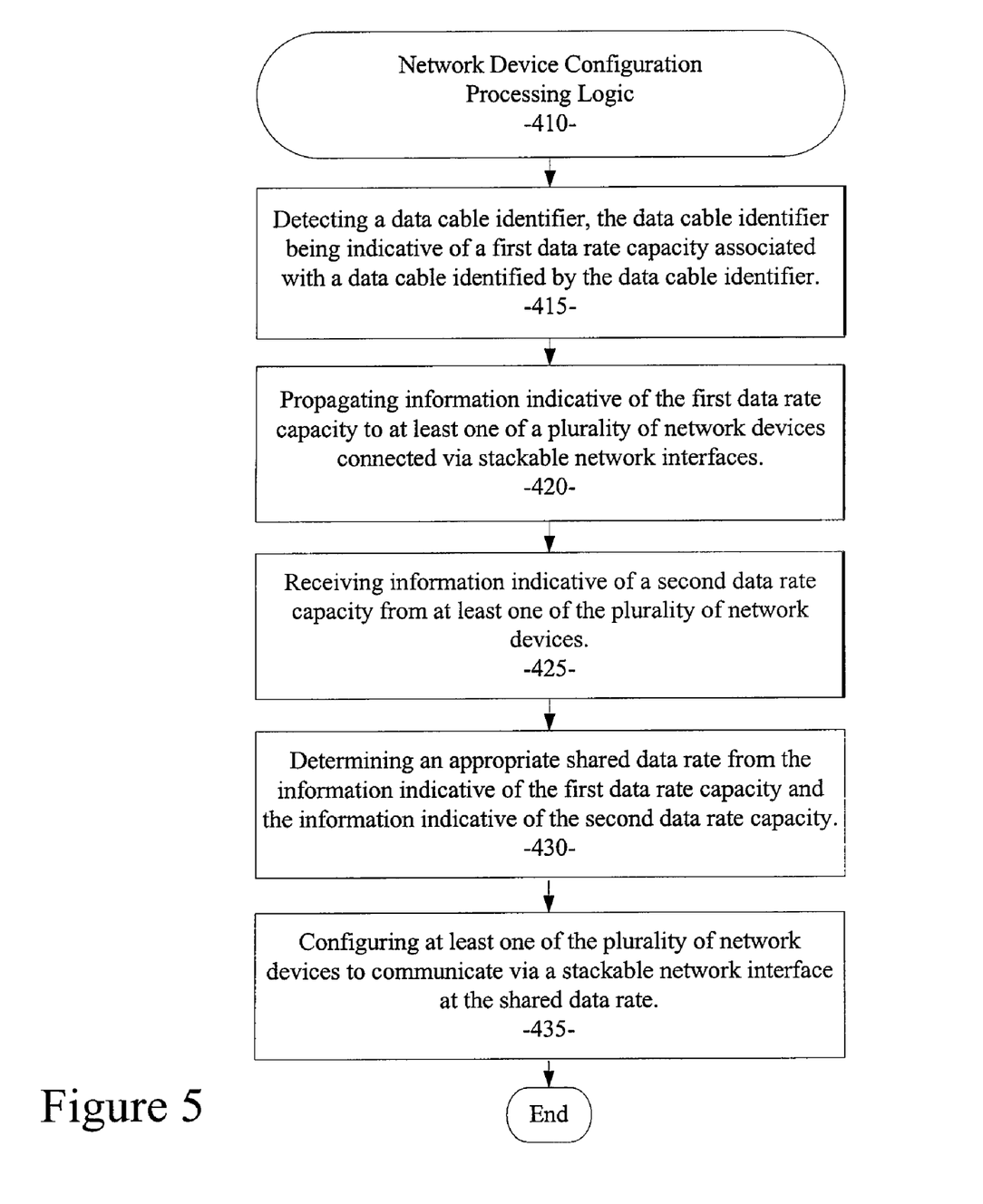
FIG. 5 is a flow diagram illustrating the processing flow for a particular example embodiment.

Various embodiments described herein provide an apparatus and method for configuring a shared data rate in a stackable interface network. FIG. 5 illustrates a process flow diagram for an example embodiment. In the embodiment 410 shown, an apparatus and method for configuring a shared data rate in a stackable interface network includes: detecting a data cable identifier, the data cable identifier being indicative of a first data rate capacity associated with a data cable identified by the data cable identifier (processing block 415); propagating information indicative of the first data rate capacity to at least one of a plurality of network devices connected via stackable network interfaces (processing block 420); receiving information indicative of a second data rate capacity from at least one of the plurality of network devices (processing block 425); determining an appropriate shared data rate from the information indicative of the first data rate capacity and the information indicative of the second data rate capacity (processing block 430); and configuring at least one of the plurality of network devices to communicate via a stackable network interface at the shared data rate (processing block 435).

Figure 6:
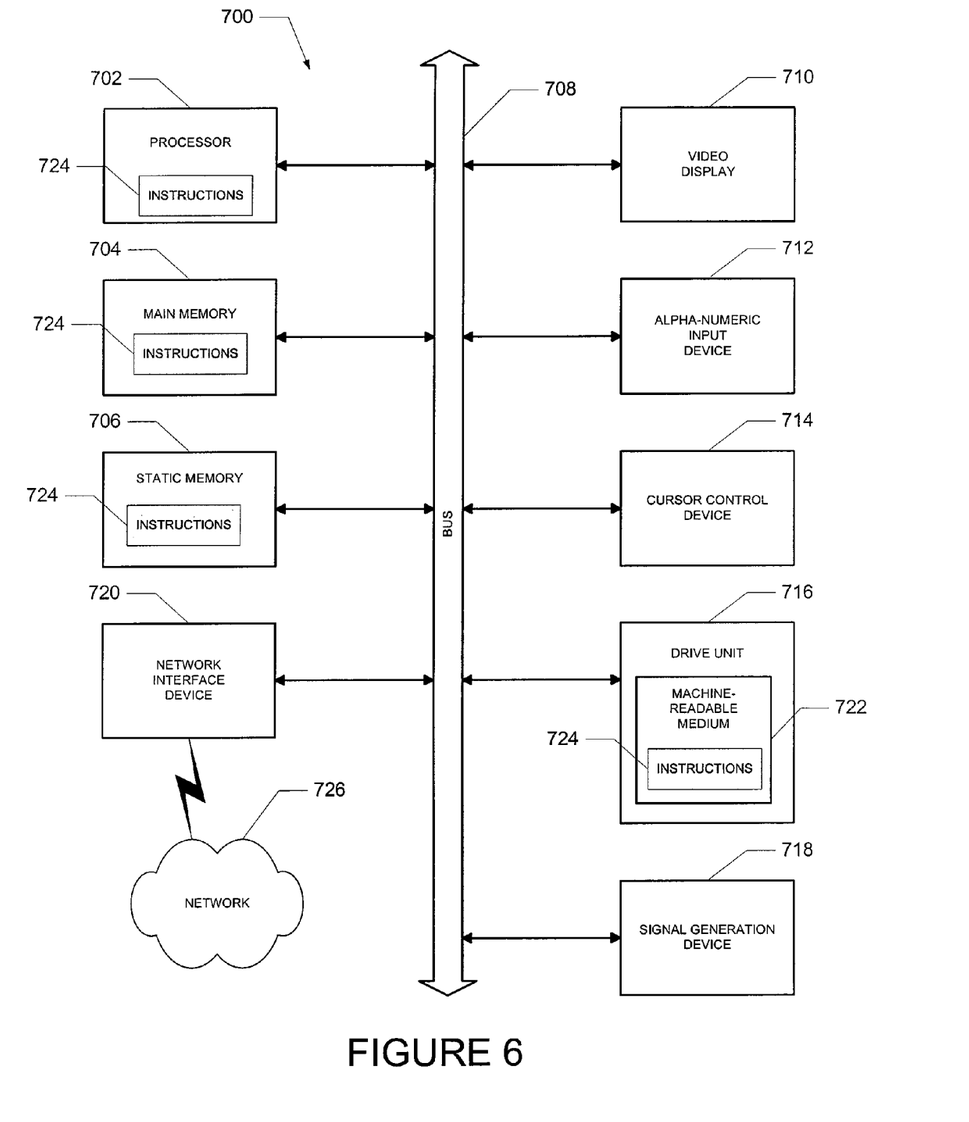
FIG. 6 illustrates an example of a computing system on which processing for various embodiments can be implemented.

FIG. 6 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Although the present specification describes components and functions implemented in the embodiments with reference to particular standards and protocols, the disclosed subject matter may be not limited to such standards and protocols. Each of the standards for Internet and other packet-switched network transmission (e.g., transmission control protocol (TCP)/Internet Protocol (IP) (TCP/IP), User Datagram Protocol (UDP)/Internet Protocol (IP) (UDP/IP), Hypertext Markup Language (HTML), and Hypertext Transfer Protocol (HTTP) represent examples of the state of the art. Such standards are periodically superseded by faster or more efficient equivalents having similar functions. Accordingly, replacement standards and protocols having the same functions are considered equivalents.

Thus, as described above, an apparatus and method for configuring a shared data rate in a stackable interface network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   detecting a data cable identifier, the data cable identifier being indicative of a first data rate capacity associated with a data cable identified by the data cable identifier;
   propagating information indicative of the first data rate capacity to at least one of a plurality of network devices connected via a stackable network interface, the first data rate capacity being received by the at least one of the plurality of network devices from a source external to the stackable network interface;
   receiving information indicative of a second data rate capacity from at least one of the plurality of network devices;
   determining an appropriate shared data rate from the information indicative of the first data rate capacity and the information indicative of the second data rate capacity; and
   configuring at least one of the plurality of network devices to communicate via the stackable network interface at the shared data rate.

2. The method as claimed in claim 1 wherein the data cable identifier is embedded in the data cable.

3. The method as claimed in claim 1 wherein the data cable identifier is pre-configured in network device memory.

4. The method as claimed in claim 1 wherein the data cable identifier is detected through the stackable network interface.

5. The method as claimed in claim 1 including propagating information indicative of the first data rate capacity to at least one of the plurality of network devices connected via stackable network interfaces in an initialization state.

6. The method as claimed in claim 1 including retaining information indicative of the second data rate capacity from at least one of the plurality of network devices.

7. The method as claimed in claim 1 including designating a data cable speed director to determine the appropriate shared data rate.

8. The method as claimed in claim 1 wherein the shared data rate is the slowest data rate reported by any one of the plurality of network devices.

9. The method as claimed in claim 1 including enabling communication on the stackable network interface at the shared data rate.

10. An apparatus comprising:
    means for detecting a data cable identifier, the data cable identifier being indicative of a first data rate capacity associated with a data cable identified by the data cable identifier;
    means for propagating information indicative of the first data rate capacity to at least one of a plurality of network devices connected via a stackable network interface, the first data rate capacity being received by the at least one of the plurality of network devices from a source external to the stackable network interface;
    means for receiving information indicative of a second data rate capacity from at least one of the plurality of network devices;
    means for determining an appropriate shared data rate from the information indicative of the first data rate capacity and the information indicative of the second data rate capacity; and
    means for configuring at least one of the plurality of network devices to communicate via the stackable network interface at the shared data rate.

11. The apparatus as claimed in claim 10 wherein the data cable identifier is embedded in the data cable.

12. The apparatus as claimed in claim 10 wherein the data cable identifier is pre-configured in network device memory.

13. The apparatus as claimed in claim 10 wherein the data cable identifier is detected through a stackable network interface.

14. A network device comprising:
    a stackable network interface; and
    configuration logic being configured to detect a data cable identifier, the data cable identifier being indicative of a first data rate capacity associated with a data cable identified by the data cable identifier, propagate information indicative of the first data rate capacity to at least one of a plurality of network devices connected via the stackable network interface, the first data rate capacity being received by the at least one of the plurality of network devices from a source external to the stackable network interface, receive information indicative of a second data rate capacity from at least one of the plurality of network devices, determine an appropriate shared data rate from the information indicative of the first data rate capacity and the information indicative of the second data rate capacity, and configure the network device to communicate via the stackable network interface at the shared data rate.

15. The network device as claimed in claim 14 wherein the data cable identifier is embedded in the data cable.

16. The network device as claimed in claim 14 wherein the data cable identifier is pre-configured in network device memory.

17. The network device as claimed in claim 14 wherein the data cable identifier is detected through the stackable network interface.

18. The network device as claimed in claim 14 being further configured to propagate information indicative of the first data rate capacity to at least one of the plurality of network devices connected via stackable network interfaces in an initialization state.

19. The network device as claimed in claim 14 being further configured to retain information indicative of the second data rate capacity from at least one of the plurality of network devices.

20. The network device as claimed in claim 14 being further configured to designate a data cable speed director to determine the appropriate shared data rate.

21. The network device as claimed in claim 14 wherein the shared data rate is the slowest data rate reported by any one of the plurality of network devices.

22. The network device as claimed in claim 14 being further configured to enable communication on the stackable network interface at the shared data rate.

23. A system comprising:
    a data cable;
    a stackable network interface to which the data cable can be coupled; and
    configuration logic being configured to detect a data cable identifier, the data cable identifier being indicative of a first data rate capacity associated with the data cable, propagate information indicative of the first data rate capacity to at least one of a plurality of network devices connected via the stackable network interface, the first data rate capacity being received by the at least one of the plurality of network devices from a source external to the stackable network interface, receive information indicative of a second data rate capacity from at least one of the plurality of network devices, determine an appropriate shared data rate from the information indicative of the first data rate capacity and the information indicative of the second data rate capacity, and configure at least one of the plurality of network devices to communicate via the stackable network interface at the shared data rate.

24. The system as claimed in claim 23 wherein the data cable identifier is embedded in the data cable.

25. The system as claimed in claim 23 wherein the data cable identifier is pre-configured in network device memory.

* * * * *